United States Patent Office

3,370,650
Patented Feb. 27, 1968

3,370,650
HYDRAULIC FRACTURING OF SUBTERRANEAN
FORMATIONS
David J. Watanabe, Orange, Calif., assignor to Union Oil
Company of California, Los Angeles, Calif., a corporation of California
No Drawing. Filed Aug. 10, 1965, Ser. No. 478,746
14 Claims. (Cl. 166—42)

ABSTRACT OF THE DISCLOSURE

A method and fracturing fluid composition for hydraulically fracturing a subterranean formation wherein the fracturing fluid comprises a suspension of finely divided particles of a water-insoluble, oil-soluble homogeneous solid solution of wax and polymer in an aqueous solution of a water-soluble, high molecular weight, hydrolyzed polyacrylamide having from about 12 to 67 percent of the original carboxamide groups hydrolyzed to carboxyl groups.

---

This invention relates to the hydraulic fracturing of subterranean formations penetrated by a well, and more particularly to an improved method and fluid composition for hydraulically fracturing such formations.

It is well known that fluid recovery from a fluid-producing formation penetrated by a well can be enhanced by fracturing the formation so as to form fracture planes or cleavages extending from the well bore laterally into the formation. These fracture planes provide flow channels for the transport of fluid to the well, thus increasing the effective permeability of the formation. Several methods of producing such fractures have been proposed; high pressure hydraulic fracturing being one of the most widely used of these methods. Hydraulic fracturing is accomplished by pumping a fracturing fluid down the well and into contact with the underground formation to be fractured so as to subject the formation to an elevated pressure. The fracturing fluid must be injected into the well at a volume flow rate exceeding the rate of fluid loss into the formation so that the pressure of the fracturing fluid will be increased as the fluid is injected into the well. Fluid injection is continued until the pressure of the fluid at the fracturing zone is increased sufficiently to overcome the tensile strength of the formation and the weight of the overburden, thereby causing initial separation of the earth formation at a point of minimum strength. The pressure at which this fracture is initially formed is termed the formation breakdown pressure, and is usually the maximum pressure achieved during the fracturing operation. Fracturing fluid injection is continued to extend the fracture into the formation. Once started, the fracture can usually be extended at pressures less than the formation breakdown pressure.

A particulate solid propping agent can be suspended in a subsequent portion of the fracturing fluid injected into the well so as to enter the fracture created and held open by the fluid pressure. The propping agent is forced into the fracture and deposited therein to prevent closure when the fluid pressure is released. Other particulate solid matter, such as fluid loss additives, propping spacers, selective plugging agents and the like, are also desirably suspended in the fracturing fluid injected into the well. These solid particles have a tendency to separate from the fluid and settle in the bottom of the well bore, or to float to the surface, depending on the relative density of the particles, particularly in the case of low viscosity fracturing fluids. Accordingly, various viscous liquids or liquids containing bodying agents to increase their effective viscosity are employed as fracturing fluids to more effectively suspend the solid materials in the fluid and to carry these materials into the formation without substantial separation in the well.

A high fluid injection rate is essential for successful fracturing of most formations. In the attempt to increase these injection rates, efforts have been concentrated on increasing the capacity of pumping equipment. As a result, greatly increased hydraulic horsepower has become available to achieve increased injection rates and fluid pressures. However, the extent to which fracturing pressures and injection rates can be increased is not only limited by economic considerations due to higher pumping costs, but also because casing, tubing and well head maximum pressure ratings cannot be exceeded. Also, the effective pressure at the fracturing zone is further limited at higher injection rates as an increasing proportion of the developed pressure is consumed in friction loss, the effective fracturing pressure being the sum of the developed well head pressure and the static head at the fracture zone, less the friction loss through the flow conduits.

Accordingly, it is an object of the present invention to provide an improved hydraulic fracturing process for the fracturing of subterranean formations penetrated by a well. Another object is to provide an improved viscous fracturing fluid which can be injected into a well at reduced hydraulic friction loss. A further object is to provide an improved viscous fracturing fluid for the fracturing of subterranean formations which is susceptible of injection at a reduced pumping cost. A still further object is to provide a hydraulic fracturing fluid capable of injection into a well at higher flow rates than obtainable with conventional fluids at equivalent pressure drop. A still further object is to provide a low cost fracturing fluid which has improved particle carrying capacity. Other objects and advantages of the invention will be apparent to those skilled in the art from the description thereof which follows.

The foregoing objects and their attendant advantages can be realized by employing an aqueous solution of high molecular weight, partially hydrolyzed, water-soluble polyacrylamide as fracturing liquid in the hydraulic fracturing of subterranean formations. The polymer is dissolved in water and the resulting aqueous polymer solution injected into the well in conventional manner. The dissolved polymer, in rather dilute concentration, imparts increased viscosity to the water to beneficially affect the solids carrying property of the fluid. Additionally, there is imparted to the fluid the property of reduced flow resistance, or drag, as the fluid flows through a closed conduit. In one specific embodiment of the invention, the aqueous polymer solution has suspended therein finely divided, water-insoluble solid particles which function as fluid loss additives to reduce the quantity of fluid entering the formation due to natural permeability and previously existing crevices, fractures, and flow channels therein. Larger size water-insoluble, oil-soluble particles serving as selective plugging agents and propping agent spacers, as will be more fully described, and conventional nonsoluble solid propping agents can also be suspended in the aqueous polymer fracturing fluid.

The high molecular weight, partially hydrolyzed polyacrylamide employed as the viscosity modifying agent exhibits the unusual property of increasing the viscosity of water within which it is dissolved, while simultaneously effecting decreased resistance to flow. From a theoretical standpoint, the decrease in flow resistance of the polyacrylamide solution is believed attributable to the flow modifying effect of the dissolved polymer, wherein the flow pattern of the fluid somewhat resembles that obtained under conditions of laminar flow. According to the well-known flow concept, so long as the critical Reynolds number of a fluid medium flowing through an enclosed conduit is not exceeded, the fluid moves generally axially along the conduit in laminae. Above the critical Reynolds number, secondary irregularities, or turbulence, are imposed on the flow pattern with a resultant increase in eddies caused by molecular collisions in the broken laminae. This phenomenon represents the change from laminar, through transition, to turbulent flow patterns. Moreover, the onset of turbulence is accelerated by any irregularity or entrance condition which will distort the flow pattern. As turbulence increases, energy loss due to random motions and to molecular collisions becomes much greater, resulting in greater friction loss.

The partially hydrolyzed polyacrylamide macromolecule, because of dissimilarity of the side chain structure, tends to remain in a straight, or uncoiled, chain structure in aqueous solution. Under shear stress, such as results from fluid flow through a closed conduit, it is believed that the long chain polyacrylamide molecules are aligned substantially axially with the direction of fluid flow. Further, the side chains of these molecules become interlocked with those of adjacent molecules, forming elastic flexible dividers which separate the water molecules into enclosed compartments moving along the flow conduit. Nearly all of the molecular components of the fluid are retained within their own laminae with the polymer structure serving as flow guides. Moreover, the dividers dampen any turbulence that is imposed upon the flow pattern by irregularity or entrance condition. Thus, the dissolved polymers reduce energy loss due to random motions and to collisions, and make more energy available for sustaining a high fluid flow rate.

However, without regard to the foregoing theoretical consideration, and for these or as yet unexplained reasons, high molecular weight, hydrolyzed polyacrylamides, having from about 12 to about 67 mole percent of the original carboxamide groups hydrolyzed to carboxyl groups, impart an increase in viscosity to an aqueous fracturing fluid and simultaneously effect a substantial reduction in the resistance to flow when the aqueous polymer solution is passed through a closed conduit under turbulent flow conditions. Thus, the present invention embodies a method of improving the hydraulic fracturing of earth formations through the use of aqueous compositions rendered more viscous, yet less resistant to flow, by the incorporation therein of hydrolyzed polyacrylamides containing from about 12 to about 67, and preferably from about 12 to about 45 mole percent of acrylic acid moieties in combined form in the molecule. Although such polymers which are less than about 12 percent hydrolyzed impart viscosity increasing and friction reducing properties to an aqueous solution, these polymers are more readily adsorbed from solution by the earth formation into which they are injected, thus reducing the beneficial effect within the formation. It is among the advantages of the invention that polyacrylamides hydrolyzed to about 12 percent, or more, are adsorbed in underground strata to only a minimal extent. It is a further advantage of the invention that said hydrolyzed polyacrylamides are not rendered insoluble by the presence in the solution of concentrations of calcium ions and sodium ions such as are commonly encountered in oil field brines. Yet another advantage of the invention resides in the fact that only very small amounts of the polymer are required to achieve the beneficial effects.

The hydrolyzed polyacrylamides employed in the present invention are water-soluble, substantially free of cross-linking between polymer chains and have from about 12 percent to about 67 percent, and preferably from about 12 to about 45 percent, of the carboxamide groups originally present in the polyacrylamide hydrolyzed to carboxyl groups. The term "hydrolyzed polyacrylamide," as employed herein is inclusive of the modified polymers wherein the carboxyl groups are in the acid form and also of such polymers wherein the carboxyl groups are in the salt form, provided that the salts are water-soluble. Thus, for example, the hydrolyzed polyacrylamides can be employed in the form of sodium, potassium, or other alkali metal salt, the ammonium salt or mixed salts of sodium, potassium, magnesium, calcium, and the like. Salts of polyvalent ions, such as iron and aluminum, have reduced solubility and for this reason are to be avoided. The polyacrylamides, from which the hydrolyzed polyacrylamides of the invention are derived, may be homopolymers of acrylamide or copolymers thereof with up to about 10 percent by weight of other compounds such as vinyl acetate, acrylonitrile, methacrylonitrile, vinyl alkyl ethers, vinyl chloride, and the like, provided the copolymers so employed are characterized by water-solubility and freedom from cross-linking as set forth above.

Further, the hydrolyzed polyacrylamides employed in accordance with the present invention are characterized by high molecular weight. As a result, it is possible to obtain aqueous solutions having a desirably increased viscosity with the use of a minimum amount of the polymeric ingredient. The hydrolyzed polyacrylamides employed herein are characterized by a molecular weight of at least 500,000 and molecular weights of 1,000,000 or more are preferred. The viscosity of a standard solution of polymer under controlled conditions is correlated with the molecular weight of the polymer. Accordingly, it has been found that the hydrolyzed polyacrylamides suitable for use in the invention are those characterized by a viscosity of at least 6 centipoises for a 0.5 percent by weight solution thereof in aqueous 4 percent by weight sodium chloride solution at a temperature of 25° C. as determined with an Ostwald viscosimeter.

Acrylamide polymers can be prepared in known manner, as for example, by heating acrylamide in aqueous solution with a peroxide catalyst such as an alkali metal persulfate or an organic hydroperoxide or by photopolymerizing acrylamide in aqueous solution with an activator such as riboflavin. The resulting polyacrylamide can be hydrolyzed in any suitable fashion, as, for example, by heating an aqueous solution of polyacrylamide with the appropriate amount of sodium hydroxide or other alkali metal hydroxide to produce the desired hydrolyzed polyacrylamide. The latter can be employed in the invention directly as produced in aqueous solution. Alternatively, the hydrolyzed polyacrylamide can be dried and flaked or powdered as on a drum drier or the desired product can be precipitated from solution by addition of a water-miscible organic solvent such as methanol, ethanol or acetone.

In carrying out the invention, the hydrolyzed polyacrylamide is dissolved in water in any suitable fashion to provide a solution having the desired viscosity and flow properties. Alternatively, the hydrolyzed polyacrylamide can be dissolved in brine or an aqueous solution of the polymer can be diluted with brine to form a solution having ionic constituents similar or identical to those in the connate water in the oil field where the fracturing operation is to be performed. In general, with the high molecular weight hydrolyzed polyacrylamides preferably employed, that is with polymers having a molecular weight of at least 500,000, it is desirable to employ from about 0.01 to 0.5 percent by weight or more of hydrolyzed polyacrylamide in the fracturing fluid. In practice, the fracturing fluid can have a viscosity of from slightly over that of pure water (1.0 centipoise at 20° C.) to about 1000 centipoises, and preferably from about 1.1 to 100 centiposes. The exact polymer addition to be employed for maximum efficiency will depend on the size of the flow conduits, the formation depth, the nature of the formation, injection rates, temperature and the nature of other additives or constituents added to the fracturing fluid.

As previously mentioned, various water-insoluble, finely divided solid fluid loss additives, such as silica flour, clay and commercially compounded solid materials for example, can be dispersed in the viscous fracturing fluid so as to partially or completely plug the formation face about the periphery of the well bore and along the fracture plane, and thereby reduce the loss of fracturing fluid to the formation. Although these materials are generally satisfactory from the standpoint of reducing fluid loss and increasing fracture efficiency, their use frequently causes irreparable damage to the formation as permanent plugs are formed resulting in reduced oil permeability. Although some of the deposited material can be removed from the exposed formation about the periphery of the well bore by well-known techniques, the material penetrating into the formation, particularly along the fracture planes, is extremely difficult to remove. Formation damage can be materially decreased by the use of an oil-soluble fluid loss additive which is dissolved by the connate oil, thus eliminating the problem of permeability loss because of permanent plugging. Although any of the aforementioned oil-insoluble fluid loss additives can be employed with the viscous fracturing fluid of this invention, permanent formation damage is likely to result from the deposition of insoluble particles in the formation, as with conventional fracturing fluids. For this reason, oil-soluble fluid loss additives are preferred.

Any oil-soluble, relatively water-insoluble, finely divided solid particulate matter which can be suspended or dispersed in the viscous fracturing fluid can form a suitable fluid loss additive. Such materials include naphthalene and other oil-soluble, water-insoluble, normally solid hydrocarbons, and the like. Preferred oil-soluble, water-insoluble fluid loss additives can be prepared from homogeneous solid solutions of hydrocarbon wax, such as paraffin wax of a single or multiple melting-point grade, melting above about 120 F., and polymers including (1) addition polymers of an olefin having between two and four carbon atoms in the monomer molecules; (2) copolymers of an olefin having between two and four carbon atoms and an alkyl acrylate containing not more than four carbon atoms in the alkyl group, such as esters formed by the reaction of acrylic acid and an alcohol having no more than four carbon atoms; (3) copolymers of an olefin having between two and four carbon atoms and esters formed by the reaction of butenic acid and an alcohol having no more than four carbon atoms; and (4) copolymers of an olefin having between two and four carbon atoms and an ester formed by the reaction of acetic acid and an unsaturated alcohol having no more than four carbon atoms. Desired properties of strength, ductility, solubility, melting point, and density not obtainable with either hydrocarbon wax or polymer alone can be achieved by homogeneous solid solutions of the two. Preferred polymer component materials include polyethylene, polypropylene, polybutylene, copolymers of ethylene and vinyl acetate, and copolymers of ethylene and ethyl acrylate. These polymer component materials can be homopolymers of polymerizable monomers selected from the above-disclosed compounds, or two or more of these monomers can be copolymerized to yield a polymeric component material having improved properties not obtainable with the homopolymers. Compositions having even further improved properties can be prepared by blending two or more of these polymer component materials with wax to form the aforementioned homogeneous solid solutions.

When used as fluid loss additives in the viscous fracturing fluid of this invention, it is preferred that the water-insoluble solid particles be extremely finely divided so as to effectively enter into small pores and flow channels in the formation. Most preferably these particles are of a size which will pass a number 20 U.S. Standard sieve.

Also, the foregoing water-insoluble, oil-soluble wax-polymer compositions are highly effective as plugging agents adapted for use in hydraulic fracturing, the particles functioning as temporary plugging agents in oil-carrying fractures and as permanent plugging agents in water-carrying fractures. By means of a stepwise fracturing and plugging technique, multiple oil-carrying fractures not otherwise obtainable can be formed in the oil-bearing formation without causing water influx.

Additionally oil-soluble solid particles of the foregoing composition can be effectively employed as propping agent spacers, in which case a mixture of these particles and permanent propping agent is suspended in the fracturing fluid and injected through the well and into the fracture. The mixed particles are randomly deposited in the fracture. On contact with connate oil, the oil-soluble particles are dissolved leaving the remaining permanent propping agent in spaced relationship and thereby attaining increased permeability along the fracture plane. For application as either plugging agents or as propping agent spacers, oil-soluble, water-insoluble solid particles of the above wax-polymer composition within the size range passing a number 4 and being retained on a number 20 U.S. Standard sieve are preferred. Where the oil-soluble particles function only as propping agent spacers, it is preferred that they be of the same size range as the propping agent with which they are employed.

A particularly preferred wax-polymer composition for use in fluid loss control, temporary plugging of oil-carrying fractures, permanent plugging of water-carrying fractures, and for propping agent spacer applications is a homogeneous solid solution of refined paraffin wax melting between about 130° F. and about 165° F. and not more than about 40 percent by weight copolymer ethylene and ethyl acrylate or vinyl acetate. Addition of small quantities of surfactant to the fracturing fluid improves the water wetting property of the solid particles and facilitates their suspension in the viscous fracturing fluid.

Other preferred particulate solid solutions include various blends of the aforementioned water-insoluble polymers and halogenated aromatic hydrocarbons or alcohols melting above about 120° F., which blends can also contain wax, and blends of these polymers with wax and resin.

These homogeneous solid solutions of waxes and polymers are blended products readily prepared by melting the individual components and then combining the resulting liquids in the proper proportions. Alternatively, the solid ingredients can be combined in the proper proportion and then melted to achieve a homogeneous liquid solution. In either case, the proportion of each component is selected to impart the previously disclosed important properties to the final solidified product.

As previously disclosed, the composition must be formed into solid particles to be advantageously employed in the fracturing process described herein, and most preferably is formed into small spherical particles of a size range selected for the particular treating application. The molten compositions of this invention are readily formable into solid particles of the desired size by several techniques, such as prilling, dispersion, extrusion, etc., and the solid composition can be formed into particles by grinding, cutting, tearing, etc. One technique of manufacture wherein solid particles of the composition are formed from molten material comprises violently agitating the molten composition within a body of nonsolvent liquid, such as water, containing a finely divided solid, such as calcium carbonate. The subdivided motlen material, maintained in constant movement while cooling below the solidification point of the composition, usually assumes a somewhat spherical particle shape. Cooling or quenching of the subdivided particles can be carried out in any convenient manner, but usually comprises the introduction of large amounts of additional cool, nonsolvent liquid to the subdivided particles dispersed in the original body of nonsolvent liquid. Alternatively, ice can be added to the nonsolvent liquid as coolant.

Fracturing of a subterranean fracturable formation can be accomplished with the viscous fracturing fluid by conventional injection technique. The best mode contemplated of practicing the aforedescribed invention is illustrated by the following description of the fracturing of an oil-producing zone of the Tensleep Formation located in Big Horn County, Wyo. This example is illustrative of a preferred mode of practicing the invention, and is not to be construed as limiting its scope. The producing formation is penetrated by a well bore having seven-inch casing set to a depth below the producing zone, the casing being perforated with four ⅜-inch perforations per foot between the intervals of 4702 to 4703 feet and 4709½ to 4713 feet. Two and seven-eighths-inch tubing is set to a depth of 4633 feet.

The producing formation is fractured using one embodiment of the improved viscous fracturing technique of this invention. Preparatory to fluid injection, crude oil is circulated down through the tubing and returned through the annulus. On the return of crude to the surface, a packer is set at depth 4723 feet and a well head pressure of 2500 p.s.i.g. placed on the annulus. Viscous fracturing fluid is prepared by dissolving partially hydrolyzed polyacrylamide, marketed by Dow Chemical Company under the commercial name ET–601, and bacteria control additive containing a surface active agent in available fresh water. The polyacrylamide is added in an amount equivalent to 0.015 pound of polymer per gallon of fluid, and the bacteria control additive at 0.9 gallon per thousand gallons of fluid. The bacteria control additive contains a surface active agent and is added as a convenient available source of surfactant to attain better dispersion of the particulate additives suspended in the fluid.

Fluid loss additive, temporary plugging agent and propping agent spacer used in this treatment is a homogeneous solid mixture of 53 percent 130–134° F. melting point refined paraffin wax, 33 percent 145–150° F. melting point refined paraffin wax, and 14 percent ethylene and ethyl acrylate copolymer marketed by the Dow Chemical Company under the trade-name Dow Copolymer Resin EA 2018. The fluid loss additive is within a size range passing a number 20 and being retained on a number 100 U.S. Standard sieve, and the temporary plugging agent and propping agent spacer is within a size range passing a number 8 mesh and being retained on a number 20 mesh screen. The permanent propping agent is 10–20 mesh glass beads.

The initial fracture is formed by the following fluid injections:

(1) A spearhead injection of 2000 gallons of the aforedescribed viscous fracturing fluid having 0.2 pound per gallon of fluid loss additive suspended therein, injection being accomplished at an average rate of 10 barrels per minute at 4100 p.s.i.g. breakdown pressure.

(2) An additional 1000 gallons of viscous fracturing fluid having .05 pound per gallon of fluid loss additive and 0.3 pound per gallon of permanent propping agent. Injection is accomplished at an average rate of 16 barrels per minute and 2800 p.s.i.g.

(3) A final 1500 gallons of viscous fracturing fluid having 0.1 pound per gallon of propping agent spacer and 0.3 pound per gallon of propping agent, injected at an average rate of 16.8 barrels per minute and 2600 p.s.i.g. The final 100 gallons of this injection was slugged with 200 pounds of temporary plugging agent and 200 pounds of glass beads.

A second stage fracture is formed by repeating the above fluid injections. Fluid injection rates average 16 to 17 barrels per minute at a well head injection pressure of between 2400 and 2500 p.s.i.g. A third stage fracture is formed by repeating these injections at flow rates and pressures comparable to those encountered in the second stage fracturing, however, in this instance, the slug treatment following the third injection is omitted. The viscous fracturing fluid is flushed from the tubing into the formation, and the well returned to service in conventional manner. The above injections are accomplished at well head pressures substantially below that calculated for a fluid of similar viscosity, or experienced in similar fracturing of other wells with untreated water and prior art viscous fluids.

The fracturing operation is considered successful as oil production is increased over four fold from the 26 barrels per day produced prior to fracturing, this rate being limited by pump capacity.

While particular embodiments of the invention have been described, it will be understood, of course, that the invention is not limited thereto since many modifications can be made, and it is intended to include within the invention any such modifications as fall within the scope of the claims.

The invention having thus been described, I claim:

1. A method of fracturing a subterranean formation penetrated by a well, which comprises injecting a viscous fracturing liquid down said well and into contact with said subterranean formation at a pressure and volume flow rate sufficient to fracture said formation, said viscous fracturing liquid comprising an aqueous solution of a water-soluble, high molecular weight, hydrolyzed polyacrylamide having from 12 to 67 percent of the original carboxamide groups hydrolyzed to carboxyl groups, and said viscous fracturing liquid having suspended therein fluid loss additive comprising finely divided particles of a water-insoluble, oil-soluble homogeneous solid solution of wax and polymer.

2. The method defined in claim 1 wherein said hydrolyzed polyacrylamide has a molecular weight of at least 500,000 and is characterized by a viscosity of at least 6 centipoises for a 0.5 percent by weight solution thereof in an aqueous 4 percent by weight sodium chloride solution at a temperature of 25° C. as determined with an Ostwald viscosimeter.

3. The method defined in claim 1 wherein said hydrolyzed polyacrylamide is employed in an amount of from about 0.01 to about 0.5 percent by weight of the fracturing liquid.

4. The method defined in claim 1 wherein said finely divided solid particles are within the size range passing a number 20 U.S. Standard sieve.

5. The method of claim 1 wherein there is suspended in said viscous fracturing liquid between about 0.05 and about 1.0 pound of said fluid loss additive per gallon of fracturing liquid.

6. The method of claim 1 including the additional step of subsequently injecting a second volume of said viscous fracturing liquid down said well and into contact with said formation at a pressure and volume flow rate sufficient to extend said fractures into said formation, said second volume of said fracturing liquid having suspended therein a permanent propping agent insoluble in earth fluids.

7. A method of fracturing a subterranean formation which comprises:

injecting a first volume of a viscous fracturing liquid down said well and into contact with said subterranean formation at a pressure and volume flow rate sufficient to produce a fracture in said formation, said viscous fracturing liquid comprising an aqueous solution of a water-soluble, hydrolyzed polyacrylamide having a molecular weight of at least 500,000 and having from about 12 to about 67 percent of the original carboxamide groups hydrolyzed to carboxyl groups, said polyacrylamide being characterized by a viscosity of at least 6 centipoises for a 0.5 percent by weight solution thereof in an aqueous 4 percent by weight sodium chloride solution at a temperature of 25° C. as determined with an Ostwald viscosimeter, and said fracturing liquid having therein between about 0.05 and about 1.0 pound of fluid loss additive per gallon of fracturing liquid, said fluid loss additive comprising finely divided particles of a water-insoluble, oil-soluble homogeneous solid solution of wax and polymer having a size within the range passing a number 20 and being retained on a number 100 U.S. Standard sieve; and injecting a second volume of said viscous fracturing liquid down said well and into contact with said formation at a pressure and volume flow rate sufficient to extend said fractures into said formation, said second volume of said fracturing liquid having a permanent propping agent insoluble in earth fluids suspended therein.

8. The method defined in claim 7 wherein said second volume of said fracturing liquid containing said suspended propping agent also has suspended therein between about 0.05 and 1.0 pound of said fluid loss additive.

9. The method defined in claim 8 including the additional step of subsequently injecting a third volume of said fracturing liquid down said well and into contact with said formation at a pressure and volume flow rate sufficient to further extend said fractures, said third volume of said fracturing liquid having suspended therein both said permanent propping agent and a temporary spacer comprising particles of a water-insoluble oil-soluble homogeneous solid solution of wax and polymer having a size within the range passing a number 4 and being retained on a number 20 U.S. Standard sieve.

10. The method defined in claim 9 wherein the initial injection of said third volume of said fracturing liquid contains less than about 1.0 pound each of said permanent propping agent and said temporary spacer particles, and wherein said permanent propping agent and said temporary spacer particles contents are increased to not exceeding 6.0 pounds per gallon each of said particle types.

11. The method defined in claim 10 wherein the injection of said first, second and third volumes of said fracturing fluid is repeated to produce multiple fractures in said formation.

12. A well treating composition comprising an aqueous solution of a water-soluble high molecular weight, hydrolyzed polyacrylamide having from 12 to 67 percent of the original carboxamide groups hydrolyzed to carboxyl groups, said solution having suspended therein finely divided particles of a water-insoluble, oil-soluble, homogeneous solid solution of wax and polymer.

13. The composition defined in claim 12 wherein said hydrolyzed polyacrylamide has a molecular weight of at least 500,000 and is characterized by a viscosity of at least 6 centipoises for a 0.5 percent by weight solution thereof in an aqueous 4 percent by weight sodium chloride solution at a temperature of 25° C. as determined with an Ostwald viscosimeter.

14. The composition defined in claim 12 wherein said finely divided solid particles are within the size range passing a number 20 U.S. Standard sieve.

References Cited
UNITED STATES PATENTS

| | | | |
|---|---|---|---|
| 2,827,964 | 3/1958 | Sandiford | 166—9 |
| 3,039,529 | 6/1962 | McKennon | 166—42 X |
| 3,254,719 | 6/1966 | Root | 166—42 |

CHARLES E. O'CONNELL, *Primary Examiner.*